United States Patent
Fouard et al.

(10) Patent No.: US 11,551,483 B2
(45) Date of Patent: Jan. 10, 2023

(54) SYSTEMS AND METHODS FOR EARLY DETECTION OF PNEUMATIC TRANSPORT ELEMENT LEAKS

(71) Applicant: The Boeing Company, Chicago, IL (US)

(72) Inventors: Jean-Michel Fouard, Marysville, WA (US); William John Sweet, Seattle, WA (US); Neal J. McCluskey, Poulsbo, WA (US)

(73) Assignee: The Boeing Company, Chicago, IL (US)

( * ) Notice: Subject to any disclaimer, the term of this patent is extended or adjusted under 35 U.S.C. 154(b) by 680 days.

(21) Appl. No.: 16/562,340

(22) Filed: Sep. 5, 2019

(65) Prior Publication Data
US 2021/0074079 A1    Mar. 11, 2021

(51) Int. Cl.
*F16L 57/06*    (2006.01)
*G07C 5/00*    (2006.01)
*G07C 5/08*    (2006.01)

(52) U.S. Cl.
CPC .............. *G07C 5/006* (2013.01); *F16L 57/06* (2013.01); *G07C 5/0816* (2013.01); *F16L 2201/30* (2013.01); *F16L 2201/80* (2013.01)

(58) Field of Classification Search
CPC .................................................. F16L 2201/30
USPC ............................................ 138/104; 702/51
See application file for complete search history.

(56) References Cited

U.S. PATENT DOCUMENTS

| | | | | |
|---|---|---|---|---|
| 3,472,062 A * | 10/1969 | Owen | ................. | G01M 3/3218 138/104 |
| 3,882,382 A * | 5/1975 | Johnson | ............... | G01N 27/048 138/104 |
| 3,907,336 A * | 9/1975 | Siegmund | ................. | F16L 9/18 138/104 |
| 6,032,699 A * | 3/2000 | Cochran | ................. | F16L 11/20 138/104 |
| 9,631,765 B2 | 4/2017 | Gonzales et al. | | |
| 9,789,747 B2 | 10/2017 | Hull et al. | | |
| 2009/0084457 A1* | 4/2009 | Tsuchie | .................. | G01M 3/32 138/104 |

* cited by examiner

*Primary Examiner* — Patrick F Brinson
(74) *Attorney, Agent, or Firm* — Kolisch Hartwell, P.C.

(57) ABSTRACT

A system for detecting a leak in a duct is disclosed, including a sheath covering a duct section, a fluid concentrating device and a sensor. The sheath is attached to a boundary portion of the duct section and forms an inner space between an outer surface of the duct section and the sheath. The fluid concentrating device has an opening through the sheath connecting the inner space to an external space outside the sheath. The inner space is sealed except for the opening through the sheath. The sensor is stationed outside the opening of the fluid concentrating device and is configured to detect fluid flow from the inner space through the opening at a level corresponding to a duct leak in a pre-burst condition.

22 Claims, 3 Drawing Sheets

SYSTEMS AND METHODS FOR EARLY DETECTION OF PNEUMATIC TRANSPORT ELEMENT LEAKS

FIELD

This disclosure relates to systems and methods for detecting leakage of fluid from a pneumatic transport element. More specifically, the disclosed examples relate to leakage detection prior to failure of a pneumatic transport element.

INTRODUCTION

Machinery and equipment such as vehicles often include pneumatic ducts for transporting hot air or gas under pressure. If a crack or leak forms in a such a duct, the transported gas can grow the crack until the duct ruptures or bursts. Ballistic debris and hot gas released by a rupture can cause damage to surrounding equipment, putting the equipment temporarily out of operation and requiring costly repairs.

To reduce the damage caused by a rupture, some ducts are encased in a protective structure to contain debris and control or channel the release of gas. Some vehicles include a sensor system to detect duct ruptures, facilitating prompt repair. However, current measures are focused primarily on containing or reducing damage after a duct has already reached catastrophic failure. A system for detecting duct leaks prior to rupture would be desirable, to allow small, inexpensive repairs to be performed in time to prevent the damage and disruption of a full rupture.

SUMMARY

The present disclosure provides systems, apparatuses, and methods relating to early detection of pneumatic duct leaks. In some examples, a system for detecting a leak in a duct may include a sheath covering a duct section, a fluid concentrating device and a sensor. The sheath may be attached to a boundary portion of the duct section and form an inner space between an outer surface of the duct section and the sheath. The fluid concentrating device may have an opening through the sheath connecting the inner space to an external space outside the sheath. The inner space may be sealed except for the opening through the sheath. The sensor may be stationed outside the opening of the fluid concentrating device and may be configured to detect fluid flow from the inner space through the opening at a level corresponding to a duct leak in a pre-burst condition.

In some examples, a method of detecting a leak in a duct may include providing a space between a duct section and a sheath cover. The space may be sealed except for a fluid concentrating device having an opening through the sheath. The method may further include collecting fluid in the space from a leak in the duct and channeling the fluid from the space through the opening in the fluid concentrating device. The method may further include detecting fluid flowing from the space through the opening to a sensor outside the sheath and directed toward the opening.

In some examples, a leak detection system may include a duct including a plurality of duct sections which collectively form an internal passage for carrying a fluid. Each duct section may have a boundary portion and a sheath fastened to the boundary portion, forming an enclosed space between the duct section and the sheath. The enclosed space for each duct section is separate from the enclosed spaces of adjacent duct sections. Each enclosed space is sealed except for an opening through the sheath. Each duct section has a sensor outside the sheath which is directed toward the opening and configured to detect fluid flow from the enclosed space through the opening at a level corresponding to a duct leak in a pre-burst condition.

Features, functions, and advantages may be achieved independently in various examples of the present disclosure, or may be combined in yet other examples, further details of which can be seen with reference to the following description and drawings.

DETAILED DESCRIPTION

Figure 1:
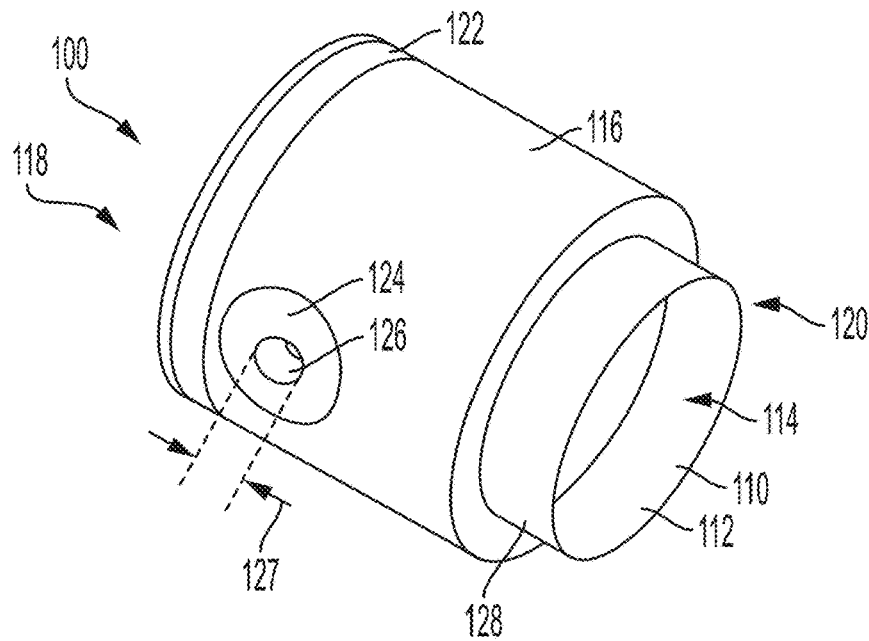
FIG. 1 is an isometric view of an illustrative section of duct having a leak detection system in accordance with aspects of the present disclosure.

Various aspects and examples of a leak detection system for a duct, as well as related methods, are described below and illustrated in the associated drawings. Unless otherwise specified, a leak detection system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, which are labeled accordingly.

Overview

In general, a leak detection system in accordance with the present teachings may include a sheath configured to enclose a section of a duct and to collect air flow from all potential leak locations on the duct section. The sheath may include an opening through which the collected air flow may be concentrated and directed toward a sensor.

A leak may be understood as an unintended discharge of gas from an interior passage of the duct section. Typically, a leak may result from a crack in a wall of the duct. A sub-critical leak may be understood as a leak from such a crack or other opening in the duct which is below a critical size for catastrophic failure of the duct. A duct having one or more sub-critical leaks and not having undergone catastrophic failure may be described as in a pre-burst condition. The leak detection system may be configured to detect a leak while the duct is in a pre-burst condition, before the duct reaches a catastrophic failure mode. The leak detection system may therefore be described as an early leak detection system.

The leak detection system may be calibrated or tuned for detection of leaks down to or at a selected minimum leak flow rate. The minimum leak flow rate may be selected to correspond to a sub-critical leak as determined by properties of the duct such as material strength and internal pressure. Dimensions and/or geometry of the leak detection system may be selected to facilitate detection of the selected leak flow rate by a selected sensor. For example, a diameter of the opening in the sheath and/or a distance of the sensor from the opening may be selected to facilitate detection of a leak of hot air according to the temperature of the hot air and a detection temperature range of a selected thermal sensor.

Examples, Components, and Alternatives

The following sections describe selected aspects of exemplary leak detection systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Leak Detection System

Figure 3:
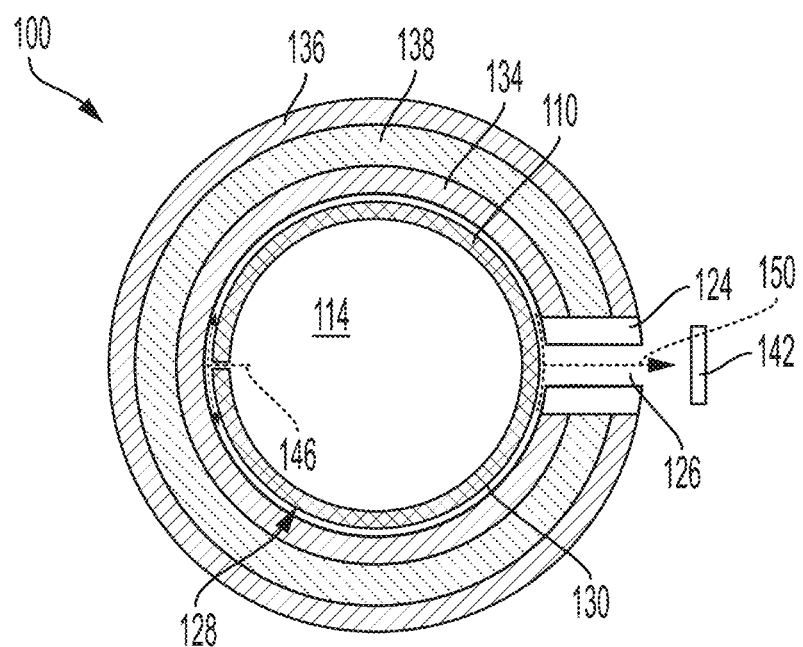
FIG. 3 is a schematic cross-sectional diagram of the leak detection system of FIG. 1, along a line perpendicular to the extent of the duct.
Figure 4:
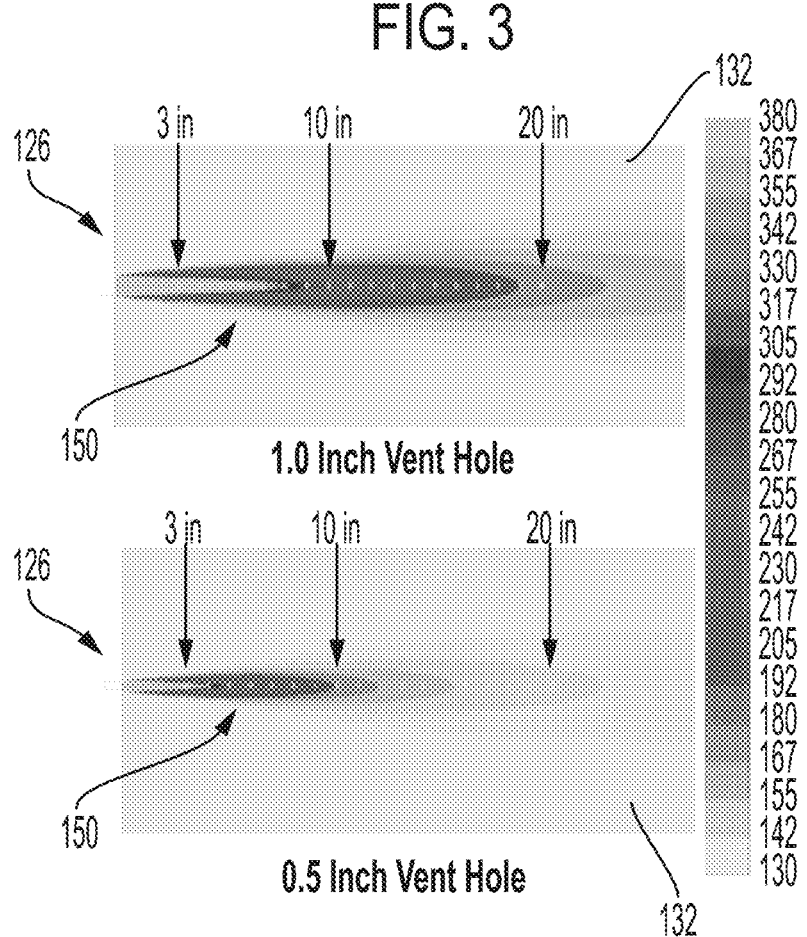
FIG. 4 is a diagram of temperature near a vent hole of first and second sizes, according to a simulation of air flow in a leak detection system.
Figure 5:
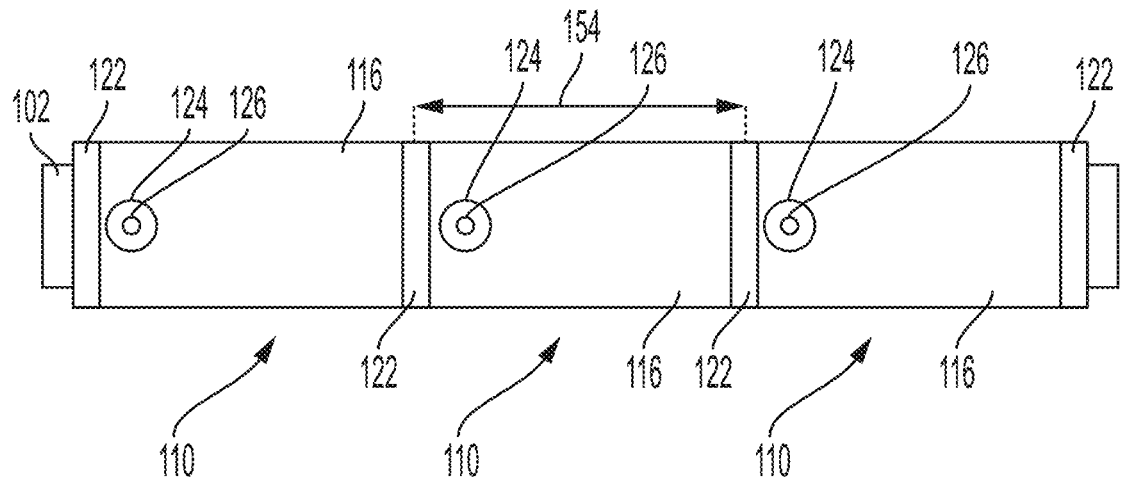
FIG. 5 is a schematic diagram of an illustrative duct having a leak detection system including multiple detection domains as described herein.

As shown in FIGS. 1-5, this section describes an illustrative leak detection system 100. System 100 is an example of an early leak detection system as described above. FIG. 1 is an isometric view of a duct section 110. The duct section is tubular, having a wall 112 defining an interior passage 114, and an outer surface 128. As shown in FIG. 5, duct section 110 is one of a plurality of duct sections, which together form a duct 102. Duct 102 may be installed in any machinery or facility and may be configured to carry any gas. For example, the duct may form part of a pneumatic system of a vehicle, or may carry pressurized gas for use in a manufacturing plant. Leak detection system 100 may be configured according to properties of duct 102 and/or the gas carried in the duct. In the present example, duct 102 and leak detection system 100 are configured for transportation and detection of aircraft bleed air at a temperature of approximately 380 degrees Fahrenheit (° F.) and a pressure of approximately 55 pounds per square inch gauge (PSIG).

Referring again to FIG. 1, duct section 110 is covered or encircled by a sheath 116. The sheath is attached to a first end 118 of duct section 110, and a second end 120 of the duct section. First end 118 may be described as a boundary portion of duct section 110, and second end 120 may be described as a boundary portion of an adjacent duct section, as described further with reference to FIG. 5 below.

In the present example, sheath 116 is attached to duct section 110 at each end by a band clamp 122, though only the clamp at first end 118 is depicted in FIG. 1. Sheath 116 may be attached, connected, and/or fixed to duct section 110 by any effective means, including but not limited to clamping, bonding, and/or fastening. The sheath may be attached to duct section 110 such that an air-tight seal is formed between the sheath and the duct section, around a full circumference of the duct section.

Figure 2:
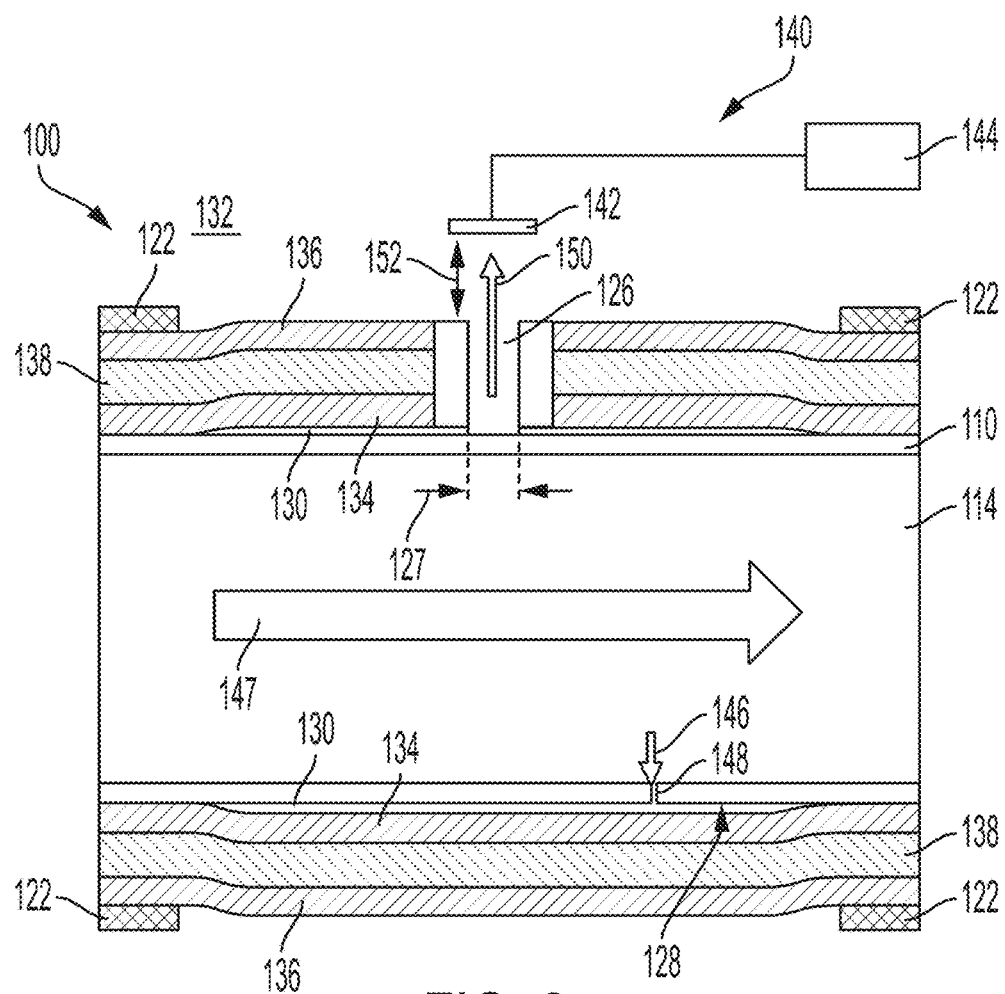
FIG. 2 is a schematic cross-sectional diagram of the leak detection system of FIG. 1, along a line parallel to the extent of the duct.

Sheath 116 includes a fluid concentrating device, which may also be referred to as a flow concentrator 124. The flow concentrator has an opening 126, which extends through sheath 116. In the present example, the opening is circular and has a diameter 127. Flow concentrator 124 is depicted adjacent first end 118 of duct section 110 but may be located at any point on sheath 116. As shown in FIG. 2, an inner space 130 is formed between outer surface 128 of duct section 110 and sheath 116. Opening 126 extends through a full thickness of sheath 116 to place inner space 130 in fluid communication with an external environment 132.

In the present example, sheath 116 includes three layers. A containment layer 134 is adjacent to outer surface 128 of the duct and may be described as inner-most. A protective layer 136 is exposed to external environment 132 and may be described as outer-most. An insulating layer 138 is sandwiched between the containment and protective layers. In some examples, sheath 116 may include a single layer which may incorporate properties of the three layers described herein. In some examples, the sheath may include two or more layers having any desirable properties. Desirable properties and/or an appropriate number of layers may depend on the properties of duct section 110, the gas carried in the duct, and/or a sensor type as described below. For example, for unheated gas and/or a non-temperature sensor sheath 116 may not require insulation. Irrespective of the number and/or type of layers, sheath 116 may include flow concentrator 124.

Containment layer 134 may include any non-porous and heat tolerant material or materials. In the present example, the containment layer is a flexible silicone sheet. Inner space 130 is formed between containment layer 134 and outer surface 128 of duct section 110. The volume of inner space 130 may vary depending on a volume or pressure of air leaked into the inner space. When duct section 110 is free of leaks, the inner space may have no volume and/or containment layer 134 may collapse against the duct section.

The containment layer may be configured to contain heated air leaked from duct section 110 and render inner space 130 air-tight, apart from opening 126. The containment layer may also be configured to form an air-tight seal with duct section 110 where sheath 116 is attached to the duct section. In the present example, containment layer 134 may form an air-tight seal when pressed against outer surface 128 of duct section 110 by band clamp 122. For another example, containment layer 134 may have a surface appropriate for effective bonding or adhesion to outer surface 128. Containment layer 134 may also be configured to resist adverse effects resulting from long-term exposure to high temperatures on outer surface 128.

Insulating layer 138 may include any heat tolerant and insulating material or materials. In the present example, the insulating layer is a fiberglass blanket insulation. Insulating layer 138 may be configured to contain the heat of air leaked into inner space 130. Such insulation may protect heat sensitive structures in external environment 132 and prevent heat loss from leaked air from prior to discharge through opening 126. Maintaining heat of such leaked air may facilitate detection, as described further below.

Protective layer 136 may be configured according to conditions of external environment 132 and may protect containment layer 134 and insulating layer 138 from such conditions. For example, protective layer 136 may protect the containment and insulating layers from exposure to adverse environmental conditions in external environment 132. For instance, protective layer 136 may allow safe handling of sheath 116 and/or prevent damage to insulating layer resulting from frictional contact of maintenance workers moving through an enclosed external environment 132 such as the interior of a vehicle. Additionally or alternatively, protective layer 136 may prevent contamination of the insulating and containment layers resulting from exposure of sheath 116 to fluids or aerosol contaminates in external environment 132. In the present example, protective layer 136 is the same silicone material as containment layer 134.

Layers 134, 136, 138 may be connected or may be free floating and fixed relative to one another by attachment to duct section 110. For example, the layers may be unconnected, but held in relative position by band clamps 122. For another example, each layer may be bonded to the adjacent layer or layers, or containment layer 134 may be bonded to insulation layer 138 while protective layer 138 is unconnected. For another example, the layers may be stitched together at the edges, with the layers free floating in a central portion but held at the edges. For another example, the layers may be quilted together, and held static across the length of the sheath. Such stitching may be sealed to protect layers 138 and 134 from adverse conditions of external environment 132.

Leak detection system 100 also includes a sensor assembly 140. The assembly includes a sensor 142, connected to a controller 144. Sensor 142 is stationed in external environment 132 outside opening 126. The sensor may include any sensor or detector appropriate to detect a flow of gas, including but not limited to a volumetric flow sensor, anemometer, pressure sensor, photoionization detector, electrochemical gas sensor, temperature sensor, and/or fiber optics.

In the present example, sensor 142 is a temperature sensor. More specifically, sensor 142 is a eutectic salt element which has a predetermined detection set point of 210° F. plus or minus approximately 10° F. In some examples, sensor 142 may include a temperature sensor with a wide detection range, such as an infrared temperature sensor, or may include other types of temperature sensor with a detection set point, such as a thermal switch. Some existing aircraft duct burst detection systems include eutectic elements. Therefore, configuration of leak detection system 100 for use with eutectic elements may allow integration of leak detection system 100 with existing structures, wiring, connections to avionics, and/or other aircraft systems. In some examples, leak detection system 100 may be configured for use with other sensors currently in use in a burst detection system.

Sensor 142 is configured to transmit a signal to controller 144 when the set point temperature is detected. Controller 144 may comprise any suitable electronic device configured to receive a signal from sensor 142. For example, the controller may include an integrated circuit and/or a data processing system. Controller 144 may be in wired and/or wireless communication with sensor 142. The controller may also be in wired and/or wireless communication with an aircraft data processing system such as a flight management computer. Upon receipt of a signal from sensor 142, controller 144 may communicate an alert to the aircraft data processing system. In some examples, controller 144 may comprise an aircraft data processing system.

Sensor 142 and/or sensor assembly 140 may be mounted in any effective manner. For example, sensor 142 may be mounted on a support fixed to protective layer 136 of sheath 116 or flow concentrator 124. For another example, sensor 142 may be mounted to a structure in external environment 132 such as an aircraft structural member.

An illustrative sub-critical leak 146 is depicted in FIGS. 2 and 3. The leak is through a crack 148 in wall 112 of the duct section. Hot air from a primary flow 147 of pressurized air along the duct is forced out through the crack to form leak 146. The leaked hot air escapes into inner space 130 at a rate determined by the size of the crack and pressure difference between interior passage 114 of duct section 110 and the inner space.

In the depicted example, crack 148 is approximately one inch in length and 0.014 inches in width. For a duct section having a wall thickness of approximately 0.032 inches and under approximately 50 PSIG of pressure, crack 148 may result in a leak flow rate of approximately one pound per minute or 15 parts per million. Crack 148 may not result in critical failure of duct section 110 unless allowed to gradually increase in size under the influence of the duct pressure.

Crack 148 is depicted as on an opposing side of wall 112 from flow concentrator 124 and sensor assembly 140. In general, leak detection system 100 may be configured to detect a leak from any point on wall 112 of duct section 110. Leak 146 may have any flow rate, but may be detected by system 100 at or above a preselected minimum leak flow rate. For example, leak detection system 100 may be tuned to detect leak flow rates of at least one pound per minute.

Leaks having less than the preselected minimum leak flow rate may grow gradually until reaching the preselected rate. All leaks may thereby be detected, even by a detection system configured to detect within a narrow range of flow rates. The minimum leak flow rate may be selected such that sufficient time will elapse between detection and growth of the leak to a critical size to allow for an intervention such as discontinuation of operation and/or repair to be safely performed. For instance, a minimum leak flow rate below two pounds per minute may be selected in the present example, as such a leak flow rate may indicate a crack which may reach critical dimensions before a desirable safe margin of time for intervention.

As hot air flows from leak 146 into inner space 130, the heated air is trapped between containment layer 134 and outer surface 128 of duct section 110. The flow of heated air may continue around the outer surface of the duct to opening 126, and out into external environment 132. Air leaking from any point on duct section may be similarly channeled through opening 126. Insulating layer 138 may reduce or prevent loss of heat from the leaked air, such that air escaping opening 126 remains close to the temperature of the primary air flow 147 through interior passage 114 of duct section 110.

Sensor 142 is positioned outside opening 126, such that the sensor is directly in a flow or plume 150 of air channeled out of the opening. The sensor is spaced a distance 152 from opening 126, such that the flow of air out of the opening has not yet cooled below the predetermined detection set point of the sensor. In the present example, sensor 142 is spaced approximately two to three inches from opening 126, such that flow 150 of air cools from approximately 380° F. at the opening to approximately 210° F. or greater at the sensor.

Multiple characteristics of detection system 100 can be selected to allow a specific sensor to detect a selected minimum leak flow rate based on properties of duct section 110 such as temperature, pressure, and flow rate of primary air flow 147. One such tunable characteristic is sensor spacing 152. Another such tunable characteristic is diameter 127 of opening 126. As discussed further below, a volume of inner space 130 may also be tuned, for instance by varying a distance between band clamps 122.

FIG. 4 shows two charts depicting modeled temperatures of an airflow stream from opening 126, for two opening diameters 127 (See FIG. 1). The upper chart depicts temperatures outside an opening with a diameter of 1 inch, while the lower chart depicts temperatures outside an opening with a diameter of 0.5 inch. The size of the opening alters the flow dynamics and mixing with air in external environment 132, which in turn changes the distance over which a particular drop in temperature is reached. The larger opening produces a moderate temperature drop due to slower mixing with limited to no disturbances, while the smaller opening produces a rapid temperature drop due to more mixing through stronger entrainment.

Therefore, an effective spacing for the sensor depends on the size of the opening. Speed of temperature drop may also be affected by properties of the external environment such as ambient temperature and/or external airflow. For example, a duct mounted near an aircraft engine may have a higher ambient temperature in the external environment, while a duct mounted in an aircraft wing may have a markedly lower ambient temperature and may be subject to strong cross flows. Detection system 100 may accordingly vary based on location within an aircraft and/or a best overall configuration for all locations may be selected. For example, when mounted on wing-installed ducts the detection system may have a smaller opening to avoid disturbances from external flow and therefore also have a smaller sensor spacing.

In the present example, as depicted in FIGS. 1-3, opening 126 has a diameter 127 of approximately 1.25 inches and a sensor spacing 152 of approximately three inches. Depending on the environmental factors present in an installation of detection system 100, diameter 127 may be selected in a range of 0.5 to 2 inches and sensor spacing 152 in a range of 1 to 5 inches.

For sensors having a wide temperature detection range, a broader range of spacings may be appropriate. For example, an infrared temperature sensor may be spaced according to a convenient mounting mechanism. For instance, such a sensor may be mounted on a closest structural member and/or may be mounted directly at the opening. For other types of sensors, such as a volumetric flow sensor, the sensor may be spaced according to a desired attenuation of flow and thus relevant flow characteristic, such as flow volume. In some examples, little to no attenuation may be appropriate for a selected sensor type, and the sensor may be mounted in opening 126 of flow concentrator 124.

FIG. 5 is a schematic diagram of duct 102, including three duct sections 110. In general, a duct may include any number of duct sections, as appropriate to the extent of the duct. In the present example, duct 102 is approximately six feet in length. Each duct section has first and second ends 118, 120 which may be described as boundary portions of the duct sections.

In the present example, sheath 116 is a single continuous blanket, encircling all three duct sections 110. The sheath is clamped by band clamps 122 at first end 118 and second end 120 of each duct section, to form three separate inner spaces. Clamps 122 may be described as defining duct sections 110, and each section has a length 154 as defined between two adjacent clamps. For each duct section, sheath 116 includes a flow concentrator 124 with an opening 126. In the present example, flow concentrators 124 are evenly spaced along duct 102, in a matching position in each duct section. In some examples, the flow concentrators may be located according to architecture of external environment 132 and/or in any appropriate distribution.

A sensor assembly or sensor, not shown, may be stationed outside each opening. Detection system 100 may be described as an array of detectors and/or as including an array of sensors. In some examples, each sensor may be associated with a separate controller. In the present example, the detection system includes a single controller to which each sensor will send a signal when a flow of heated air is detected.

Each duct section may function as described above. Additionally, leak detection system 100 may be configured to provide location information for a detected leak. For example, when one of the sensors detects a fluid flow through the respective opening and sends a signal to the controller, the controller may associate a duct section identifier with the signal. The controller may provide an alert with the identifier for the relevant duct section, such that a crew member or maintenance worker of the aircraft may access the appropriate duct section to identify the leak.

In the present example, section length 154 is approximately 24 inches. The section length may vary according to a desired volume of inner space 130, as shown in FIGS. 2 and 3. The volume of the inner space may affect the temperature and flow rate of air channeled through opening 126, and may therefore also affect selection of diameter 127 of the opening and sensor spacing 152. In the present example, section lengths between 12 and 36 inches may provide an acceptable volume of inner space 130.

Referring again to FIG. 5, section length 154 may be consistent between sections as depicted or may vary between sections. The section length may determine a number of sensors needed for leak detection system 100, and therefore a larger section length may be desirable to reduce costs. The section length may also determine a precision with which location of a detected leak can be specified by the detection system, and therefore a smaller section length may be desirable to improve precision.

In some examples, sheath 116 may include multiple separate pieces. For instance, each duct section may include a separate sheath which may be butted against or overlap with an adjacent sheath. In some examples, leak detection system 100 may comprise multiple detection zones, in place of or in addition to duct sections. For instance, two separate rectangular sheaths may be bonded to opposing sides of the duct, to form separate detection zones on either side of the duct. Such detection zones may be advantageous for decreasing the inner space volume and improving leak location specificity on larger ducts.

B. Illustrative Method

Figure 6:
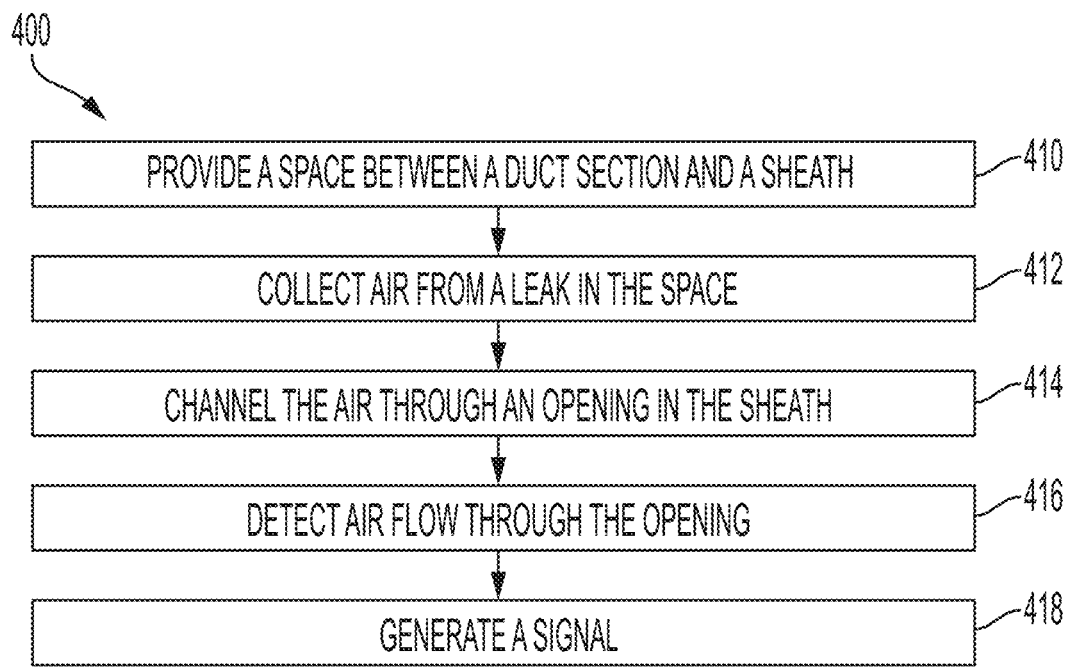
FIG. 6 is a flow chart depicting steps of an illustrative method of detecting a leak in a duct, according to the present teachings.

This section describes steps of an illustrative method 400 of detecting a leak in a duct; see FIG. 6. Aspects of leak detection systems described above may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 400 are described below and depicted in FIG. 6, the steps need not necessarily all be performed, and in some cases may be performed simultaneously or in a different order than the order shown.

At step 410, the method includes providing a space between a duct section and a sheath. The space may be formed by sealing a perimeter of a non-porous material of the sheath to an outer surface of the duct section. For example, the sheath may encircle a tubular duct section and each end of the sheath may be clamped to the duct section. For another example, a square sheet of sheath material may be bonded to a portion of the outer surface of the duct section, along each side of the square.

Step 412 includes collecting air from a leak in the space. A leak may be formed in the duct section, for instance due to fatigue of the duct wall and emergence of a crack in the wall. The leak may be described as sub-critical and/or the duct may be described as in a pre-burst condition. That is, the duct may not have undergone critical failure. Air flowing through the duct may leak out of the crack or other opening and become trapped between the sheath and the duct, in the provided space.

At step 414, the method includes channeling the air through an opening in the sheath. The opening may extend through a full thickness of the sheath, such that air collected in the space between the sheath and the duct is able to escape to an external environment, outside the sheath. The size, position, and/or other characteristics of the opening may be selected to channel the air into a plume having desired flow properties. For example, the opening may be sized large enough that the plume has a gradual temperature drop-off, but small enough to produce a flow velocity resistant to anticipated gravitational effects.

Step 416 includes detecting air flow through the opening. Detecting air flow may include sensing a flow of fluid from a leak prior to a catastrophic failure of the duct, or duct burst event. In some examples, detecting air flow may include sensing a flow of fluid resulting from a leak having a flow rate of less than two pounder per minute and/or having a selected flow rate.

The air flow may be detected by a sensor positioned outside the opening, in the plume of air channeled out of the opening. The sensor may be configured to detect a flow from the opening corresponding to a selected minimum flow rate of the leak. The sensor may be of any type appropriate to detection of a flow of air or gas. For example, the sensor may detect temperature, flow velocity, pressure, and/or presence of selected compounds. The sensor may be positioned according to factors including but not limited to the type of sensor and the flow properties of the plume. For example, the sensor may be a temperature sensor and may be spaced at a distance corresponding to a desired drop in air temperature, such as between 0.5 and 2.0 inches from the opening.

At step 418 the method includes generating a signal. The signal may be generated by the sensor and may be communicated to a controller. The sensor may generate the signal when fluid flow having a selected property and/or properties is detected. For example, a signal may be generated when the sensor detects fluid flow in a temperature range of 200 to 240 degrees Fahrenheit. The signal may indicate and/or contain information indicating detection of a flow of air from the opening indicative of a leak in the duct section. In some examples, the sensor may be one of a plurality of sensors and the signal may include an identifier for the sensor generating the signal.

In some examples, the method may further include producing an alert indicating the presence of a leak. For instance, the method may include communicating information received by the controller in the signal from the sensor to a data processing system of a vehicle, such as the flight control computer of an aircraft. The alert may comprise for instance, a visual indicator on a display of the flight control computer.

Illustrative Combinations and Additional Examples

This section describes additional aspects and features of systems and methods for detecting a leak in a duct, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A system for detecting a leak in a duct, comprising:
a sheath covering a duct section, the sheath being attached to a boundary portion of the duct section and forming an inner space between an outer surface of the duct section and the sheath,
a fluid concentrating device having an opening through the sheath connecting the inner space to an external space outside the sheath, wherein the inner space is sealed except for the opening through the sheath, and
a sensor stationed outside the opening of the fluid concentrating device, configured to detect fluid flow from the inner space through the opening at a level corresponding to a duct leak in a pre-burst condition.

A1. The system of A0, wherein the duct section is tubular.

A2 The system of A0 or A1, wherein the duct section forms a portion of a tubular section.

A3. The system of any of A0-A2, wherein the sheath includes a non-porous containment layer and an insulation layer surrounding the containment layer, the opening of the fluid concentrating device extending from the inner space through the containment layer and the insulation layer.

A4. The system of any of A0-A3, wherein the sensor detects temperature of fluid flowing out of the opening of the fluid concentrating device.

A5. The system of any of A0-A4, wherein the sensor detects air flow from the opening.

A6. The system of any of A0-A5, wherein the opening has a diameter in a range of 0.5 to 2.0 inches.

A7. The system of any of A0-A6, wherein the sensor is spaced from the opening of the fluid concentrating device by a distance in a range of 1.0 to 5.0 inches.

A8. The system of any of A0-A7, further comprising:
a controller configured to generate a signal when the sensor detects a fluid flow rate indicating the duct section has a leak prior to a duct burst event.

A9. The system of A8, wherein the sensor is configured to detect a fluid flow rate corresponding to a leak rate of between 10 and 20 parts per million.

A10. The system of A8 or A9, wherein the controller generates a signal when the sensor detects a predetermined fluid flow rate, the sensor being spaced from the opening of the fluid concentrating device by a distance corresponding to the predetermined fluid flow rate.

A11. The system of A10, wherein the controller generates a signal when the sensor detects a predetermined temperature, the sensor being spaced from the opening of the fluid concentrating device by a distance corresponding to the predetermined temperature.

A12. The system of any of A8-A11, wherein the controller generates a signal when the sensor detects a fluid flow from the opening corresponding to a fluid pressure in the inner space in a range of 25 to 75 pounds per square inch.

A13. The system of any of A8-A12, wherein the controller generates a signal when the sensor detects temperature in a range of 200 to 240 degrees Fahrenheit.

A14. The system of any of A0-A13, wherein end portions of the sheath are attached to the duct section by clamps.

A15. The system of any of A0-A14, wherein end portions of the sheath are attached to the duct section by adhesive.

A16. The system of any of A0-A15, wherein the duct section is tubular, having a length in a range of 12 to 36 inches.

A17. The system of any of A0-A16, wherein the sensor is one of (a) a volumetric flow sensor, (b) an anemometer, (c) a pressure sensor, (d) a photoionization detector, (e) a electrochemical gas sensor, (f) a temperature sensor, or (g) an optical sensor.

B0. A method of detecting a leak in a duct, comprising:
 providing a space between a duct section and a sheath cover, the space being sealed except for a fluid concentrating device having an opening through the sheath,
 collecting fluid in the space from a leak in the duct,
 channeling the fluid from the space through the opening in the fluid concentrating device, and
 detecting fluid flowing from the space through the opening to a sensor outside the sheath and directed toward the opening.

B1. The method of B0, wherein sensor is spaced from the opening by a distance in a range of 0.5 to 5.0 inches.

B2. The method of B0 of B1, further comprising:
 generating a signal when the sensor detects fluid flow from the space at a temperature in a range of 200 to 240 degrees Fahrenheit.

B3. The method of any of B0-B2, wherein the detecting step includes sensing a fluid flow from a leak in the duct prior to a burst event.

B4. The method of any of B0-B3, wherein the detecting step includes sensing a fluid flow through the opening corresponding to a pressure in the space in a range between 25 to 75 pounds per square inch.

B5. The method of any of B0-B4, wherein the detecting step includes sensing a fluid flow through the opening corresponding to a leak rate between 10 and 20 parts per million.

B6. The method of any of B0-B5, wherein the opening has a diameter in a range of 0.5 to 2.0 inches.

C0. A leak detection system for a duct, comprising:
 a non-porous sheath covering a duct section, the sheath being fastened to a boundary portion on an outer surface of the duct section forming a space between the outer surface of the duct section and the sheath, the space being sealed from the outside environment except for an opening through the sheath, and
 a sensor outside the sheath spaced from the opening and configured to detect fluid flow from a leak in the duct section prior to a burst condition.

C1. The leak detection system of C0, wherein the opening has a diameter in a range of 0.5 to 2.0 inches.

C2. The leak detection system of C0 or C1, wherein the sensor is spaced from the opening by a distance in a range of 1.0 to 4.0 inches.

C3. The leak detection system of any of C0-C2, wherein the sensor is configured to detect fluid flow from a leak in the duct when a fluid pressure in the space is between 25 to 75 pounds per square inch.

D0. A leak detection system, comprising:
 a duct including a plurality of duct sections collectively forming an internal passage for carrying a fluid, each duct section having a boundary portion, and a sheath fastened to the boundary portion forming an enclosed space between the duct section and the sheath, wherein the enclosed space for each duct section is separate from the enclosed spaces of adjacent duct sections, wherein the enclosed space of each duct section is sealed except for an opening through the sheath,
 wherein each duct section has a sensor outside the sheath directed toward the opening and configured to detect fluid flow from the enclosed space through the opening at a level corresponding to a duct leak in a pre-burst condition.

D1. The leak detection system of D0, wherein each duct section is tubular.

D2. The leak detection system of D0 or D1, wherein each duct section forms a portion of a tubular section.

D3. The leak detection system of any of D0-D2, wherein the sheath includes a non-porous containment layer and an insulation layer surrounding the containment layer, the opening of the fluid concentrating device extending from the inner space through the containment layer and the insulation layer.

D4. The leak detection system of any of D0-D3, wherein the sheath is fastened to the boundary portion of each duct section by clamps.

Advantages, Features, and Benefits

The different examples of the leak detection systems and methods described herein provide several advantages over known solutions for detecting leaks in pneumatic ducts. In particular, illustrative examples described herein allow leaks to be detected prior to catastrophic failure of a duct.

Additionally, and among other benefits, illustrative examples described herein allow leaks in a duct to be repaired before the duct bursts, thereby avoiding costs associated with extensive repairs and disruptions to normal operation.

Additionally, and among other benefits, illustrative examples described herein allow leaks at any point around a circumference of a duct to be detected by a single sensor assembly.

Additionally, and among other benefits, illustrative examples described herein allow detection of leaks as small as 10 to 20 parts per million.

Additionally, and among other benefits, illustrative examples described herein allow tuning of the leak detection sensitivity.

No known system or device can perform these functions, particularly with reduced weight and bulk relative to burst containment systems. Thus, the illustrative examples described herein are particularly useful for aircraft ducting. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A system for detecting a leak in a duct, comprising:
a sheath covering a duct section, the sheath being attached to a boundary portion of the duct section and forming an inner space between an outer surface of the duct section and the sheath,
a fluid concentrating device having an opening through the sheath connecting the inner space to an external space outside the sheath, wherein the inner space is sealed except for the opening through the sheath, and
a temperature sensor stationed outside the opening of the fluid concentrating device, configured to detect fluid flow from the inner space through the opening at a level corresponding to a duct leak in a pre-burst condition.

2. The system of claim 1, wherein the duct section is tubular.

3. The system of claim 1, wherein the sheath includes a non-porous containment layer and an insulation layer surrounding the containment layer, the opening of the fluid concentrating device extending from the inner space through the containment layer and the insulation layer.

4. The system of claim 1, the opening has a diameter in a range of 0.5 to 2.0 inches.

5. The system of claim 4, wherein the sensor is spaced from the opening of the fluid concentrating device by a distance in a range of 1.0 to 5.0 inches.

6. The system of claim 1, wherein the sensor is spaced from the opening of the fluid concentrating device by a distance in a range of 1.0 to 5.0 inches.

7. The system of claim 1, further comprising:
a controller configured to generate a signal when the sensor detects a fluid flow rate indicating the duct section has a leak prior to a duct burst event.

8. The system of claim 7, wherein the controller generates a signal when the sensor detects a predetermined temperature, the sensor being spaced from the opening of the fluid concentrating device by a distance corresponding to the predetermined temperature.

9. The system of claim 7, wherein the controller generates a signal when the sensor detects a temperature in a range of 200 to 240 degrees Fahrenheit.

10. The system of claim 1, wherein end portions of the sheath are attached to the duct section by clamps.

11. The system of claim 1, wherein end portions of the sheath are attached to the duct section by adhesive.

12. A method of detecting a leak in a duct, comprising:
providing a space between a duct section and a sheath cover, the space being sealed except for a fluid concentrating device having an opening through the sheath,
collecting fluid in the space from a leak in the duct,
channeling the fluid from the space through the opening in the fluid concentrating device, and
detecting a temperature of fluid flowing from the space through the opening to a sensor outside the sheath.

13. The method of claim 12, wherein the sensor is spaced from the opening by a distance in a range of 0.5 to 5.0 inches.

14. The method of claim 13, wherein the opening has a diameter in a range of 0.5 to 2.0 inches.

15. The method of claim 12, further comprising:
generating a signal when the sensor detects fluid flow from the space at a temperature in a range of 200 to 240 degrees Fahrenheit.

16. The method of claim 12, wherein the detecting step includes sensing a fluid flow from a leak in the duct prior to a burst event.

17. The method of claim 16, wherein the detecting step includes sensing a fluid flow corresponding to a leak flow rate of less than 2 pounds per minute.

18. A leak detection system, comprising:
a duct including a plurality of duct sections collectively forming an internal passage for carrying a fluid, each duct section having a boundary portion and a sheath fastened to the boundary portion forming an enclosed space between the duct section and the sheath, wherein:
the enclosed space for each duct section is separate from the enclosed spaces of adjacent duct sections,
the enclosed space of each duct section is sealed except for an opening through the sheath, and
the sheath of each duct section includes a flexible non-porous containment layer,
wherein each duct section has a sensor outside the sheath configured to detect fluid flow from the enclosed space through the opening at a level corresponding to a duct leak in a pre-burst condition.

19. The leak detection system of claim 18, wherein each duct section is tubular, having a length in a range of 12 to 36 inches.

20. The leak detection system of claim 18, wherein the sheath includes the containment layer and an insulation layer surrounding the containment layer, the opening through the sheath in each duct section extending from the enclosed space through the containment layer and the insulation layer.

21. The leak detection system of claim 18, wherein the sheath is fastened to the boundary portion of each duct section by clamps.

22. The leak detection system of claim 18, wherein the enclosed space of each duct section has a volume which varies depending on a volume or pressure of leaked fluid.

* * * * *